April 9, 1946.  J. W. HOWLETT  2,398,005

PISTON

Filed Oct. 28, 1944

Inventor
John W. Howlett
by Mawhinney & Mawhinney
Attorneys

Patented Apr. 9, 1946

2,398,005

UNITED STATES PATENT OFFICE 2,398,005

PISTON

John William Howlett, London, England, assignor to Wellworthy Piston Rings Limited, London, England Application October 28, 1944, Serial No. 560,842
In Great Britain May 12, 1944

5 Claims. (Cl. 309—11)

This invention relates to a cast metal piston, for a fluid-pressure engine, of the kind having intermediate skirt portions, at the pressure faces (i. e., at the faces at the ends of a diameter of the piston which is at right-angles to the axis of the wrist pin), which do not extend circumferentially as far as the wrist pin bosses and the lugs supporting the bosses from the head, the intermediate skirt portions being internally connected with the wrist pin bosses by relatively-flexible webs and being directly connected to a skirt portion remote from the head.

Examples of pistons of this kind are disclosed in the specifications of British Patents Nos. 366,625 and 426,190, and in practice they are very satisfactory.

In casting a piston of the kind disclosed in either of these prior specifications, the die has thin wing plugs which lie against the outer faces of the said webs, i. e., between the webs and the internal faces of the intermediate skirt portions; and, assuming that the piston is cast with its head downwards, these wing plugs must be withdrawn vertically after the casting operation. From this it follows that, to allow of the withdrawal of the wing plugs, it is not possible to provide the said skirt portion, which is remote from the head, with an internal belt of material, which belt can subsequently be externally machined to provide a scraper ring groove.

In some cases, however, it is important that a piston of the kind aforesaid should have a scraper ring mounted in its skirt on the side of the wrist pin bosses remote from the head. It is my main object to provide means whereby this shall be possible.

It is a further object that the circumferential spaces between the edges and inner faces of the intermediate skirt portions, on the one hand, and between the wrist pin bosses and the lugs supporting these portions, on the other hand, shall be shaped so as to allow plugs defining the shape of these spaces to be removed, after casting, in the direction of the wrist pin axis.

The piston may have at least one of the intermediate skirt portions severed by a part-circumferential slit from direct connection with the head. Furthermore, it may have a longitudinal slit extending from the end of the piston remote from the head as far as the part-circumferential slit, i. e., through one of the pressure faces of the piston.

Figures 1, 2:
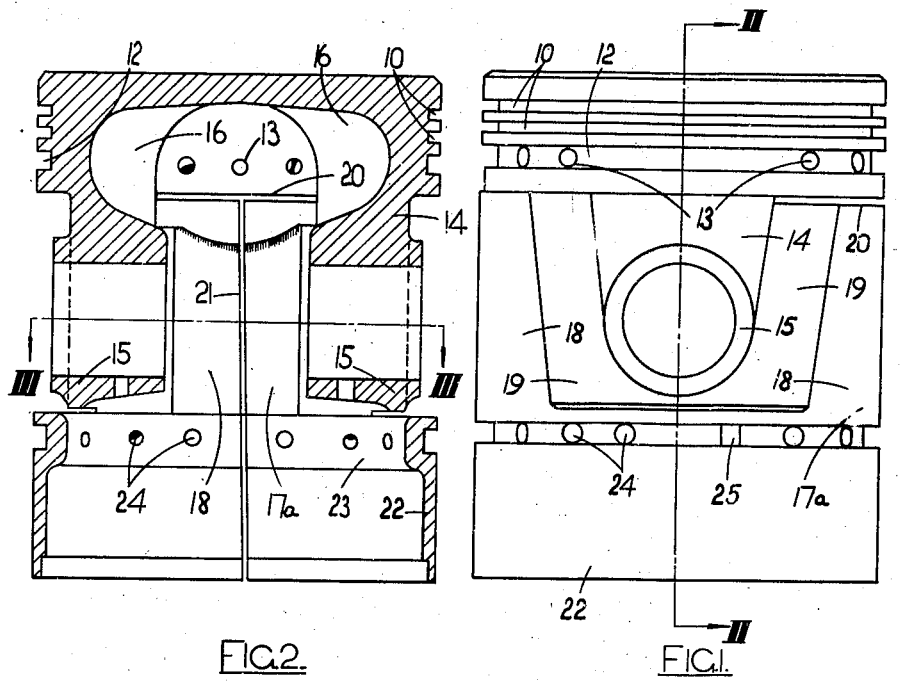
Figure 1 is an elevation of a piston according to the invention.
Figure 2 is a central longitudinal section taken on the line II—II of Figure 1.

In the construction shown, the piston is formed of a light alloy as a die casting either by gravity or pressure methods. The head 9 has two piston ring grooves 10, 10 in it and a scraper ring groove 12 provided with through openings 13 leading in a known manner to the interior of the piston. It also has two downwardly extending lugs 14, 14 carrying the wrist pin bosses 15, 15. On the inner face of the head are two pairs of parallel webs 16, 16 directly joining the wrist pin bosses internally to the head.

Figure 3:
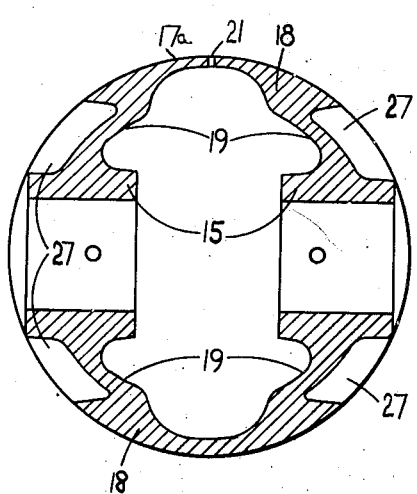
Figure 3 is a cross-section taken on the line III—III of Figure 2.
Figure 4:
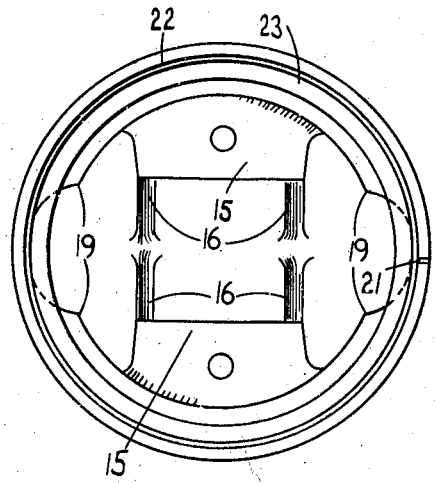
Figure 4 is an underneath view of Figure 1.

The skirt comprises on the pressure faces of the piston two intermediate skirt portions 18, 18 which, it will be observed from Figure 3, do not extend circumferentially as far as the wrist pin bosses 15 and the lugs 14 supporting them, and the intermediate skirt portions are internally connected with the wrist pin bosses by means of relatively-flexible webs 19, 19. One of the intermediate skirt portions, marked 17a in Figures 1, 2 and 3, is severed from the head by a part-circumferential slit 20. This pressure face of the skirt has a longitudinal slit 21 in it extending from the slit 20 through the skirt portion 22 remote from the head. In the latter skirt portion, which is formed integrally with the intermediate skirt portions, is left an internal belt of metal 23 which is subsequently externally machined to provide a scraper ring groove having through openings 24 communicating with the interior of the piston. 25 represents a stop peg mounted in this belt of metal and extending into the groove to prevent the scraper ring from turning.

In casting this piston it would not be possible to use axially-draw-out wing plugs, as aforesaid, as their withdrawal would be prevented by the belt 23. I have therefore arranged the circumferential spaces 27 (see Figure 3), between the adjacent edges of each intermediate skirt portion and the adjacent edges of the wrist pin bosses and their supporting lugs, so that they can be shaped by plugs which, after casting, can be withdrawn laterally, i. e., in the direction of the axis of the wrist pin bosses. The spaces 27 taper slightly in cross-section, as shown by Figure 3, to admit of this.

Thus, by means of the invention I obtain a flexible cast piston which has the advantages of the kind aforesaid and which is able, in addition, to carry a scraper ring in the skirt portion remote from the head.

What I claim as my invention and desire to secure by Letters Patent of the United States is:

1. A cast metal piston having a head, wrist pin bosses rigidly supported from the head, intermediate skirt portions, at the pressure faces, which do not extend circumferentially as far as the wrist pin bosses, relatively-flexible webs of generally part-cylindrical shape connecting said bosses to the inner faces of said intermediate skirt portions, the circumferential spaces between the edges of said intermediate skirt portions and said bosses being shaped so as to allow plugs defining the shape of these spaces to be removed, after casting, in the direction of the wrist pin axis, and a skirt portion, remote from the head, connected to said intermediate skirt portions.

2. A cast metal piston having a head, wrist pin bosses, lugs rigidly supporting the wrist pin bosses from the head, intermediate skirt portions, at the pressure faces, which do not extend circumferentially as far as the wrist pin bosses or said lugs, relatively-flexible webs of generally part-cylindrical shape connecting said bosses to the inner faces of said intermediate skirt portions, the circumferential spaces between the edges of said intermediate skirt portions, on the one hand, and said bosses and the lugs supporting these bosses, on the other hand, being shaped so as to allow plugs defining the shape of these spaces to be removed, after casting, in the direction of the wrist pin axis, and a skirt portion, remote from the head, connected to said intermediate skirt portions.

3. A cast metal piston of light alloy having a head, wrist pin bosses rigidly supported from the head, intermediate skirt portions, at the pressure faces, which do not extend circumferentially as far as the wrist pin bosses, relatively-flexible webs of generally part-cylindrical shape connecting said bosses to the inner faces of said intermediate skirt portions, the circumferential spaces between the edges of said intermediate skirt portions and said bosses being shaped so as to allow plugs defining the shape of these spaces to be removed, after casting, in the direction of the wrist pin axis, and a skirt portion, remote from the head, connected to said intermediate skirt portions, said skirt portion, remote from the head, having therein a belt of metal which is peripherally grooved to receive a scraper ring.

4. A cast metal piston of light alloy having a head, wrist pin bosses rigidly supported from the head, intermediate skirt portions, at the pressure faces, which do not extend circumferentially as far as the wrist pin bosses, at least one of said intermediate skirt portions being severed by a part-circumferential slit from direct connection with the head, relatively-flexible webs of generally part-cylindrical shape connecting said bosses to the inner faces of said intermediate skirt portions, the circumferential spaces between the edges of said intermediate skirt portions and said bosses being shaped so as to allow plugs defining the shape of these spaces to be removed, after casting, in the direction of the wrist pin axis, and a skirt portion, remote from the head, connected to said intermediate skirt portions.

5. A cast metal piston having a head, wrist pin bosses rigidly supported from the head, intermediate skirt portions, at the pressure faces, which do not extend circumferentially as far as the wrist pin bosses, relatively-flexible webs of generally part-cylindrical shape connecting said bosses to the inner faces of said intermediate skirt portions, the circumferential spaces between the edges of said intermediate skirt portions and said bosses tapering so as to allow plugs defining the shape of these spaces to be removed, after casting, in the direction of the wrist pin axis, and a skirt portion, remote from the head, connected to said intermediate skirt portions.

JOHN WILLIAM HOWLETT.